A. BUTLER.
DISTRIBUTER FOR SEED AND FERTILIZER.
APPLICATION FILED NOV. 21, 1910.
999,151. Patented July 25, 1911.
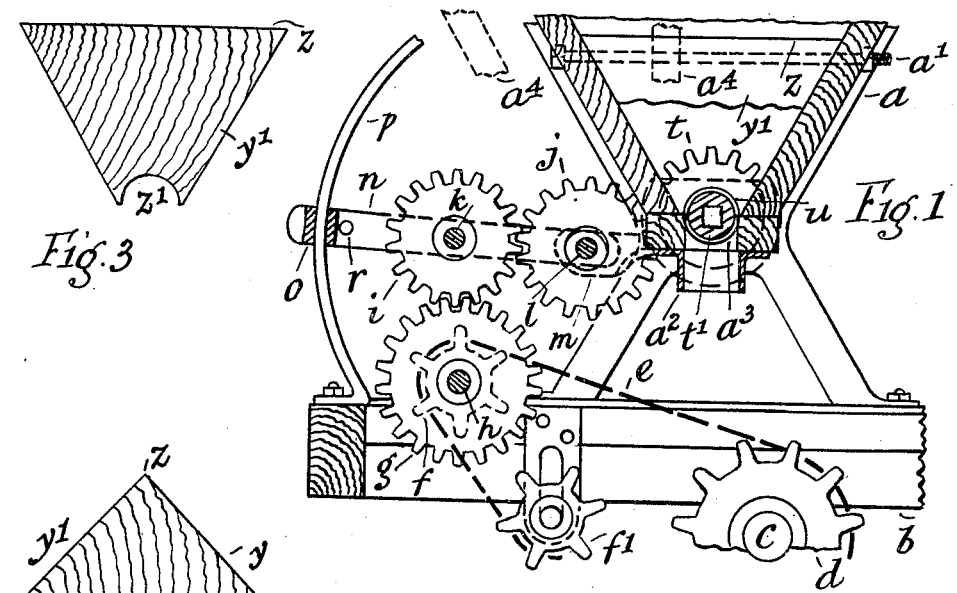
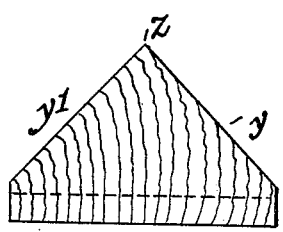
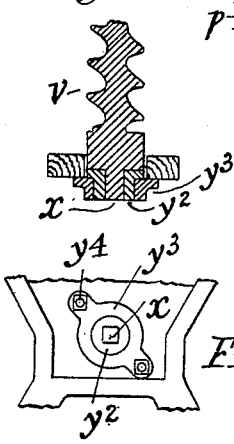
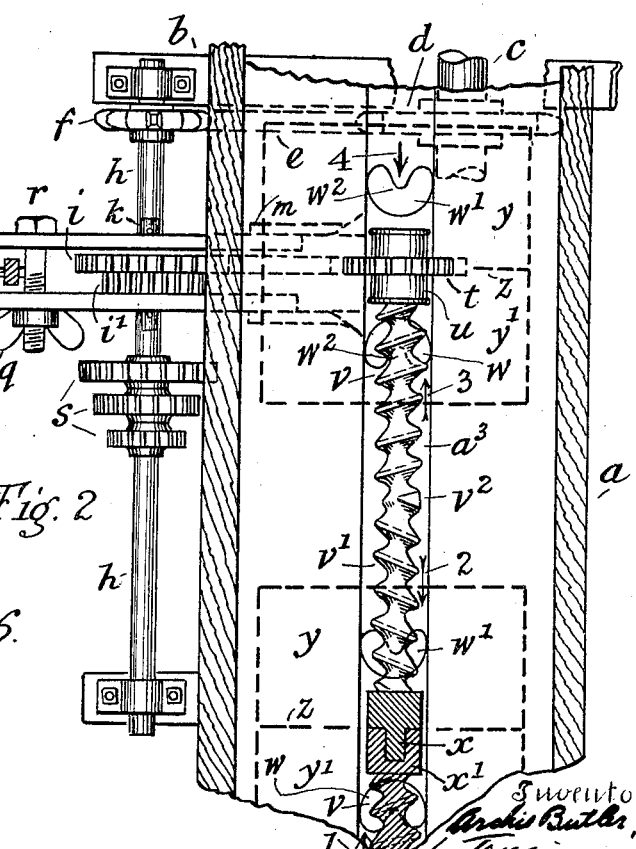
Witnesses
Inventor
Archie Butler

UNITED STATES PATENT OFFICE.

ARCHIE BUTLER, OF ST. KILDA, VICTORIA, AUSTRALIA, ASSIGNOR OF ONE-HALF TO PETER ROHS, OF MELBOURNE, AUSTRALIA.

DISTRIBUTER FOR SEED AND FERTILIZER.

999,151.      Specification of Letters Patent.      Patented July 25, 1911.

Application filed November 21, 1910. Serial No. 593,496.

*To all whom it may concern:*

Be it known that I, ARCHIE BUTLER, a subject of the King of Great Britain and Ireland, &c., residing at St. Kilda, in the State of Victoria, Commonwealth of Australia, have invented certain new and useful Improvements in Distributers for Seed and Fertilizer; and I do hereby declare the following to be a full, clear, and exact description of the invention, such as will enable others skilled in the art to which it appertains to make and use the same.

This invention relates to devices for drills or other agricultural implements for sowing seed (as oats) or fertilizer (as superphosphate), or both.

One object is to avoid the use of numerous and complex parts customary in ordinary drills and seeders; and another to provide a cheap, strong, and durable construction having parts which may be easily regulated.

In the accompanying drawings Figure 1 is an end elevation partly sectional and the lower part of the hood being broken away; Fig. 2 is a plan view partly sectional, the hood being dotted to allow parts below to appear; Fig. 3 shows an end elevation of a hood; Fig. 4 a front elevation thereof; and Figs. 5 and 6 show details of a feed screw section and end bearings thereof.

The illustrations show what I may use, but the invention is not limited to the proportions, designs, numbers, or other minor details of the parts shown.

I provide one or more suitable feed hoppers (one, marked $a$, illustrated) for the material to be sown, as one for seed or fertilizer or one for each, and I attach the (or each) hopper, in any suitable way across the implement—which may be a plow—or to its frame $b$. If two hoppers be used they may adjoin and have a vertical dividing wall or partition. Parts of a second hopper are shown in dotted lines at $a^4$. Each hopper is divided into compartments when desired as by vertical partitions as will be well understood.

In a longitudinal groove or channel in the base $a^3$ of hopper $a$, I provide one or more discharge openings, marked in pairs $w$, $w^1$, for escape of the material which will be fed to it by conveyers, each discharge opening having a projection or tongue $w^2$ extending in the direction of feed to increase the length of edge over which the material discharges, and cause the material to be better spread. Each discharge opening is protected by a hood or cover so as not to allow the fall through it of material from above when the conveyers are at rest. The hood or cover is fitted or held in place, as by bolt $a^1$ (dotted in Fig. 1), or other means. Each cover has any suitable top as ridge $z$, and sides sloping away from one another as $y$, $y^1$, to insure the sliding down of material put thereon toward feed screws $v$, $v^1$.

Fig. 2 shows two conveyer screw threads $v$, $v^1$, one left handed, the other right handed, on the same rod or conveyer section. The conveyer is rotated whereupon each section conveys the material toward its own ends, that is in opposite directions from an intermediate point $v^2$. Arrows 1, 2, 3, and 4, Fig. 2, show directions of feed to discharge openings $w$, $w^1$. The screws or conveyers move the material from between the hoods to below them, each screw or the like terminating at or just beyond a discharge opening. Any section having threads $v$, $v^1$, may be readily removed and another be substituted having screws or conveyers of different pitch or style. Each part having screw thread $v$, and each having screw thread $v^1$ is in some cases a distinct section, such sections being connected in the hopper as by sockets and projections. Each rod having the two screw or conveyer parts $v$, $v^1$ forms a section, any number of which are longitudinally connected by their ends. Thus a square or angular end $x$ on one section end fits in a socket $x^1$ in the end of the adjacent section. The base of each hood has a recess $z^1$, Fig. 3, to house the top of the end of one section having screw $v$, and of an adjoining section having screw $v^1$. The sections rotate in a semicircular or suitable channel or recess $a^3$ along the hopper bottom. From the base of the discharge openings $w$, $w^1$ may extend any suitable tubes or guides attachable as to flanges $a^2$ Fig. 1, in order to lead discharged material where required. The outer ends of the shaft formed by the connected sections are mounted in any suitable bearings carried by the hopper or the implement frame. Thus a square or angular end $x$ Figs. 5 and 6 fits into a corresponding hole in a ferrule $y^2$ having a cylindrical periphery and adapted to rotate in an outer bearing as a recess in a plate $y^3$ attached as by bolts $y^4$ to the hopper end, so keeping the screw sections connected in line and rotatable simultaneously.

Instead of parts $v$, $v^1$ being integral with a section spindle, sleeves having screw threaded or conveyer exteriors may be fixed on a spindle; and I use in some cases one long spindle containing the desired number of right and left handed conveyer members to feed to the discharge openings, instead of a series of short connected sections.

The sections or spindles having conveyers are driven by gearing. I locate under a hood a cog wheel $t$ having hubs $u$ each with a square or angular socket $t^1$ Fig. 1. Into each socket a square or suitably shaped end of a conveyer section fits, one such end appearing in Fig. 2. Meshing with wheel $t$ is a wheel $j$ meshing with wheel $i$ which is on spindle $k$ and driven by wheel $g$ on shaft $h$ carrying a sprocket wheel $f$ turned by a chain $e$, taking power as from cog wheel $d$ on a main axle as $c$. Where more convenient the drive may be taken from a road or land wheel hub. An adjustable sprocket wheel or idler $f^1$ keeps any desired tension on the chain.

I provide regulating means to vary the rate of discharge of material. Thus attached to spindle $k$ or integral with wheel $i$ is a gear wheel $i^1$ of different diameter adapted to mesh instead of wheel $i$ with wheel $j$ as explained later. An adjustable frame $n$ has cheeks pivoted on spindle $l$ of wheel $j$. This spindle is mounted as on brackets $m$. This frame carries the bearings of a spindle $k$, which is reversible or arranged to be set so that wheel $i^1$ takes the place of wheel $i$. Frame $n$ has a clamp as parts $o$ and bolt $r$ and nut $q$, and $p$ is a guide arm which is gripped by clamp part $o$. The frame is lowered or set to mesh wheel $i$ (or $i^1$) with wheel $g$, or is raised when required to put the conveyers out of operation. Other speed regulation devices comprise several gear wheels $s$ arranged loosely on axle $h$; any one may be fixed to turn therewith, being previously moved into gear with wheel $i$ (or $i^1$) to actuate the conveyers.

What I claim as my invention is:—

1. In an agricultural implement, a hopper having a longitudinal channel in its base provided with a series of discharge openings, conveyer sections arranged in the channel and being removably connected with each other, a pinion fixed on one of the sections near its end, covers having V-shaped sides and recessed ends for fitting over the connected ends of the conveyer sections to inclose same and said pinion, and means for transmitting rotary motion to the pinion, substantially as described.

2. In an agricultural implement, a hopper having a longitudinal channel in its base provided with a series of discharge openings, tongues extending from the edges of said openings in the direction of the feed, a plurality of removably connected feed conveyers arranged in the channel, each conveyer having a series of oppositely arranged teeth for delivering material toward its opposite ends, a cover set over the connected ends of the adjoining conveyers, the cover having inclined sides and provided with a recess in each end for fitting over the connected ends of the conveyers to inclose same, a gear wheel fixed to one of the conveyers and arranged under one of said covers to rotate the conveyers, means to turn said gear wheel from an axle of the implement, and means to regulate the rate of feed, substantially as described.

3. In an agricultural implement, a hopper having a longitudinal channel in its base provided with a series of discharge openings, a tongue projecting from the edge of each opening in the direction of the feed, conveyer sections arranged in the channel and being removably connected with each other, a pinion fixed on one of the sections near its end, covers having V-shaped sides and recessed ends for fitting over the connected ends of the conveyer sections to inclose same and said pinion, a gear meshing with the pinion, a shaft rotatably mounted on the implement, means for transmitting motion from the axle of the machine to said shaft, a second gear on the shaft, a pair of spaced bars pivotally connected to the implement and carrying therebetween a plurality of gears of different diameters adapted to mesh with the first mentioned gear and the second gear to change the speed of the conveyer, a curved member fixed on the implement, and a clamping bolt passing through the bars of the frame for securing same in locked position to said member, substantially as described.

4. In an agricultural implement, a hopper having a series of discharge openings in its bottom, a tongue projecting from the lateral edge of each opening in the direction of the feed for spreading the material discharged through the opening, and a conveyer arranged above the openings in vertical alinement with said tongues, substantially as described.

In witness whereof I have hereunto set my hand in the presence of two witnesses.

ARCHIE BUTLER.

Witnesses:
GEORGE G. TURRI,
ALICE M. HOLT.

---

Copies of this patent may be obtained for five cents each, by addressing the "Commissioner of Patents, Washington, D. C."